June 29, 1943.   L. P. CROSMAN   2,323,205
LISTING CALCULATOR
Filed Dec. 5, 1941   7 Sheets-Sheet 1

Inventor
LORING P. CROSMAN,
By C. W. Anderson & Son.
Attorney

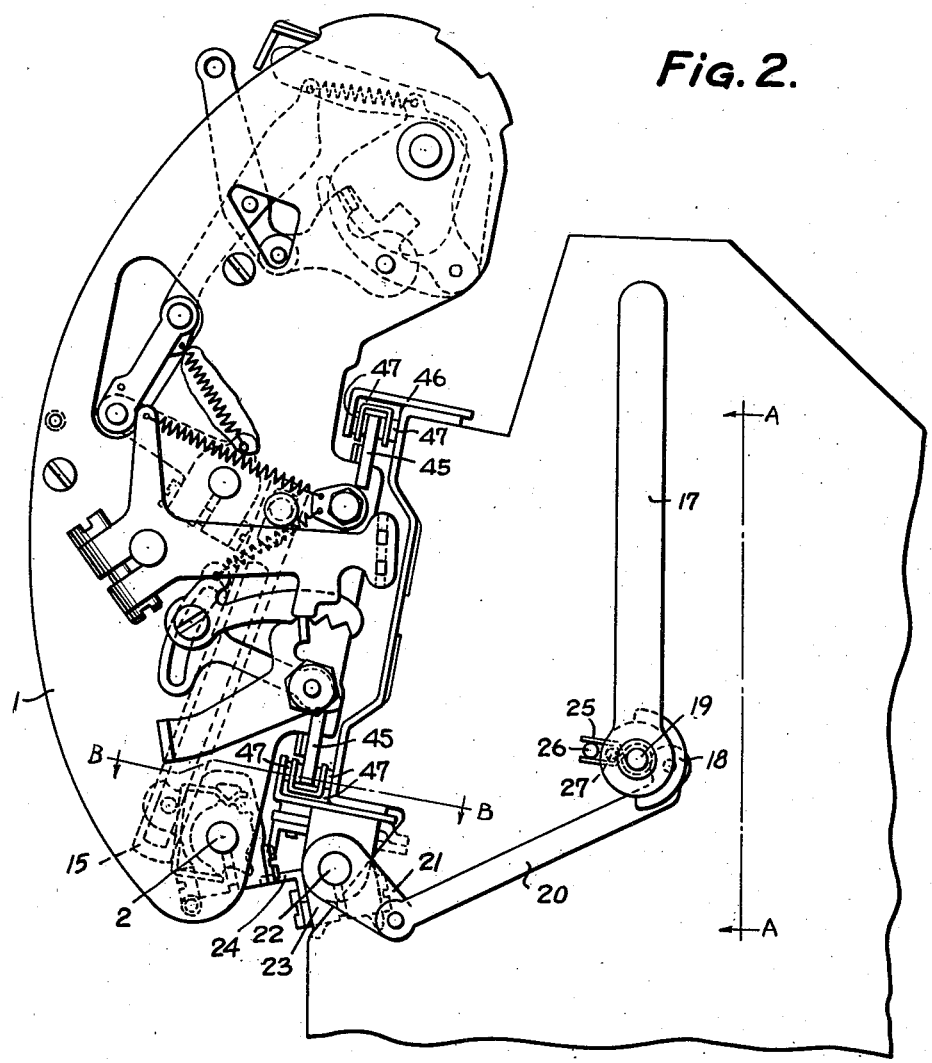

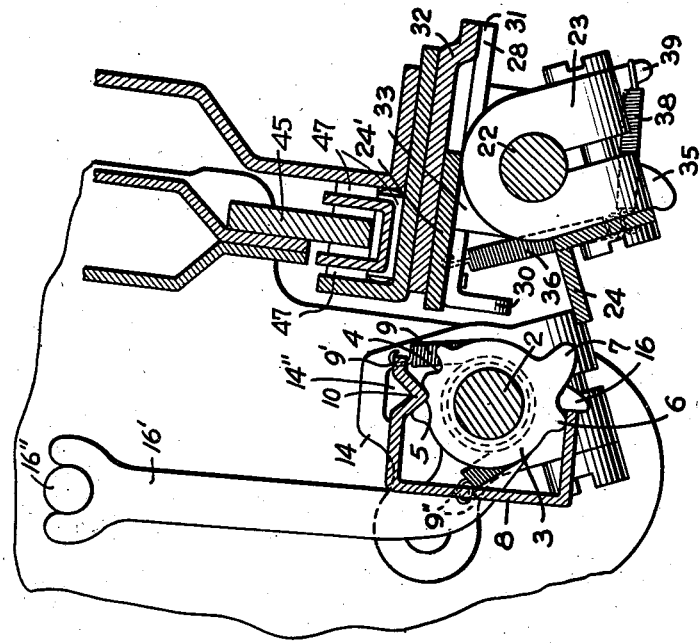
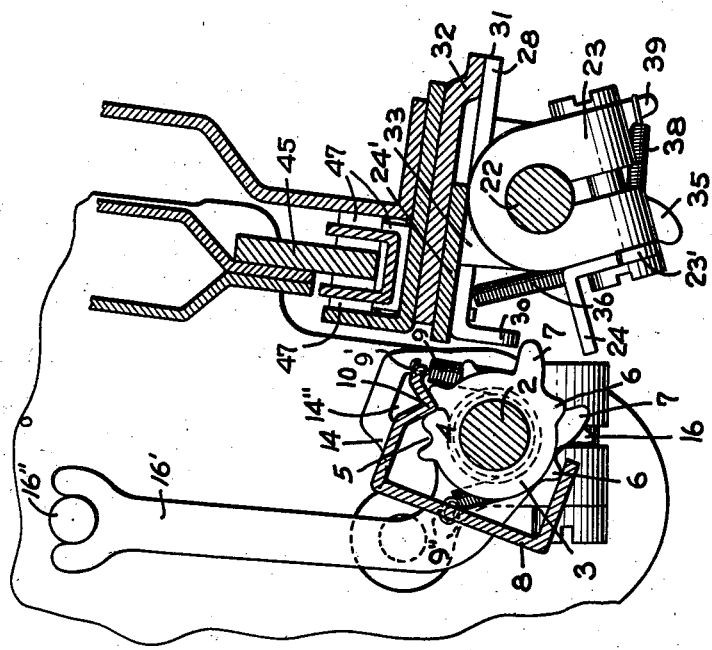

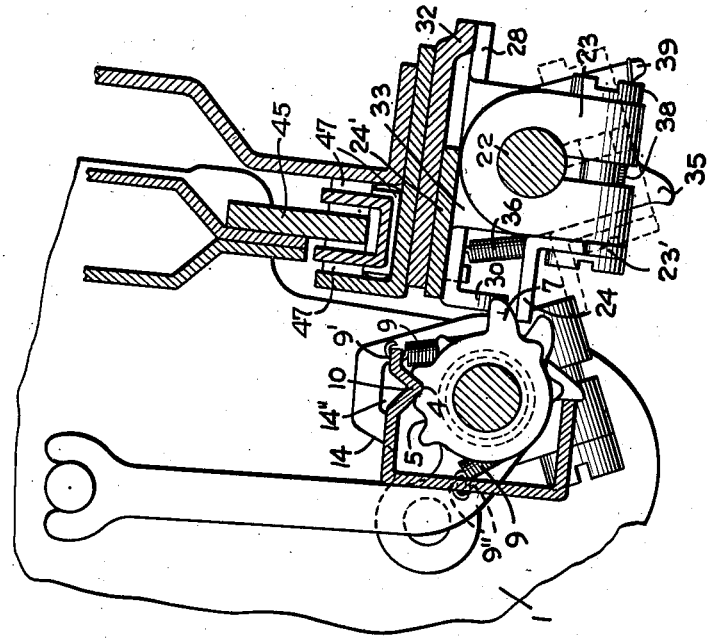
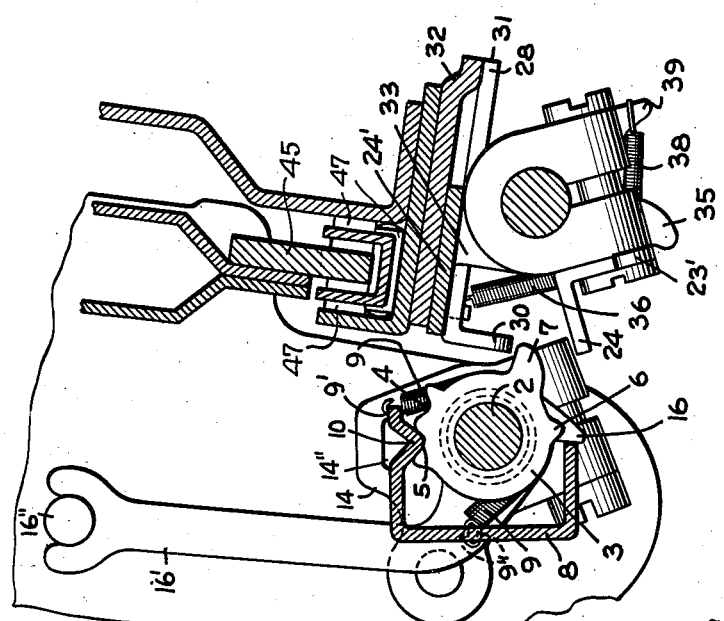

June 29, 1943.  L. P. CROSMAN  2,323,205
LISTING CALCULATOR
Filed Dec. 5, 1941   7 Sheets-Sheet 5

Inventor
LORING P. CROSMAN,
By E. W. Anderson & Son.
Attorneys

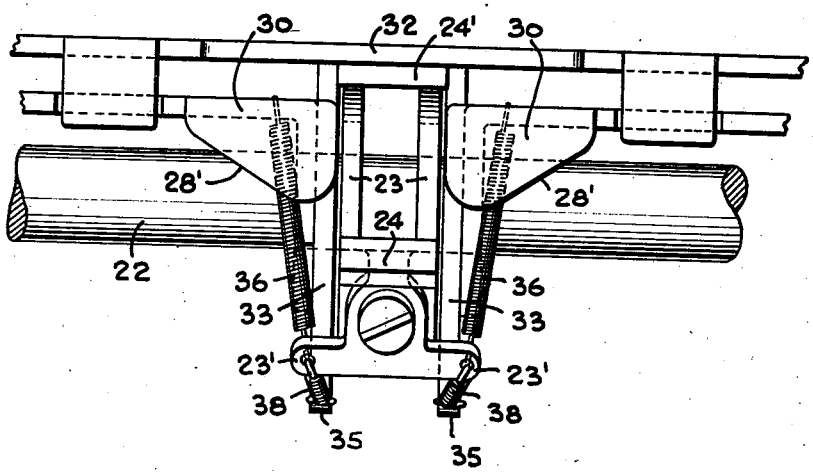
Fig. 12.
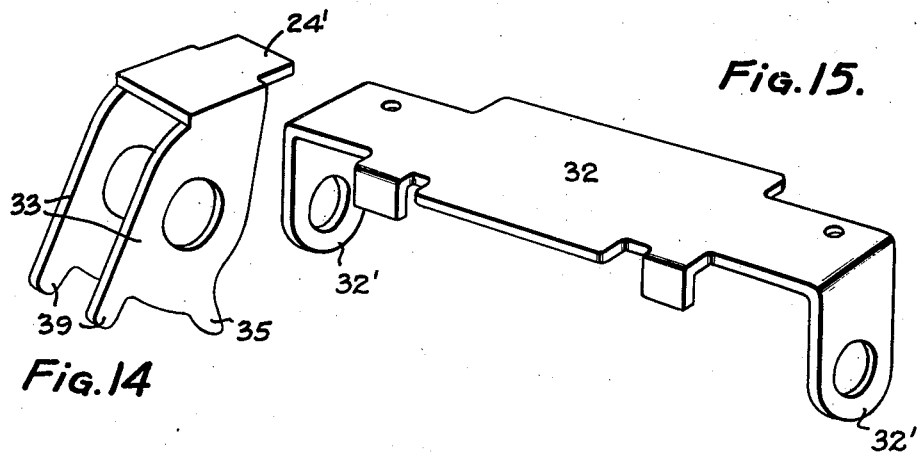
Fig. 15.
Fig. 14
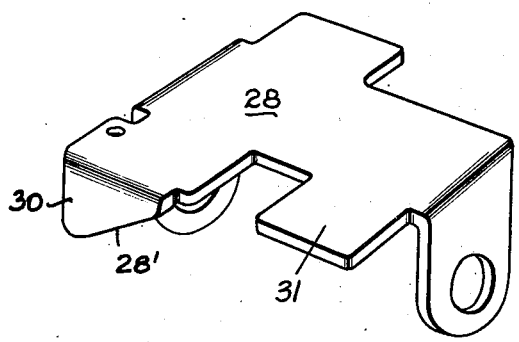
Fig. 13.

Patented June 29, 1943

2,323,205

UNITED STATES PATENT OFFICE 2,323,205

LISTING CALCULATOR

Loring Pickering Crosman, South Orange, N. J., assignor to Monroe Calculating Machine Company, Orange, N. J., a corporation of Delaware Application December 5, 1941, Serial No. 421,803

7 Claims. (Cl. 197—176)

The invention relates to listing calculators and other machines provided with a shiftable carriage and means for stopping the carriage in predetermined columnar positions in tabulating operations upon successive manipulation of a tabulating key or device and shifting of the carriage; an object of this invention being to provide means for enabling the operator to vary to a minimum extent the spacing of columns on a paper sheet and to have a greater number of such spacings at command. Another object is to eliminate the customary practice of milling a series of notches upon both sides of a single tabulating bar or upon one side of each of two tabulating bars and the use of an individual spring for each tabulating stop, which practice is expensive. Other objects and advantages will also be noted.

The invention consists in the novel construction and combination of parts as hereinafter set forth in the claims.

In the accompanying drawings,

Figure 2 is a left side elevation of the machine, showing the invention as applied, with the setting lever in normal position.

Figure 3 is an enlarged detail end view of the stop members and associated parts in normal position, with parts in section.

Figure 4 is a view similar to Figure 3, showing the stop members unlocked, upon movement of the tabulating lever in one direction.

Figure 6 is a view similar to Figure 5, the unset stop members being shown as restored to normal position, upon release of the tabulating lever and restoration thereof to normal position by its spring, the group of set stop members being shown in the position taken upon manipulation of the tabulating lever reversely in the tabulating operation.

Figure 8 is a view similar to Figure 5, showing a group of stop members in set position, upon manipulation of the setting lever to move the clamp and the lower finger thereof from dotted line to full line position.

Figure 12 is a detail rear view of the right and left latch members, the clamp bearing the setting finger for the stop members, the member bearing the restoring finger for the stop members, etc., parts being shown as broken away.

Figure 13 is a detail perspective view of the left hand latch member.

Figure 14 is a detail perspective view of the member bearing the restoring finger for the stop members.

Figure 15 is a detail perspective view of the stationary bracket.

Figure 1:
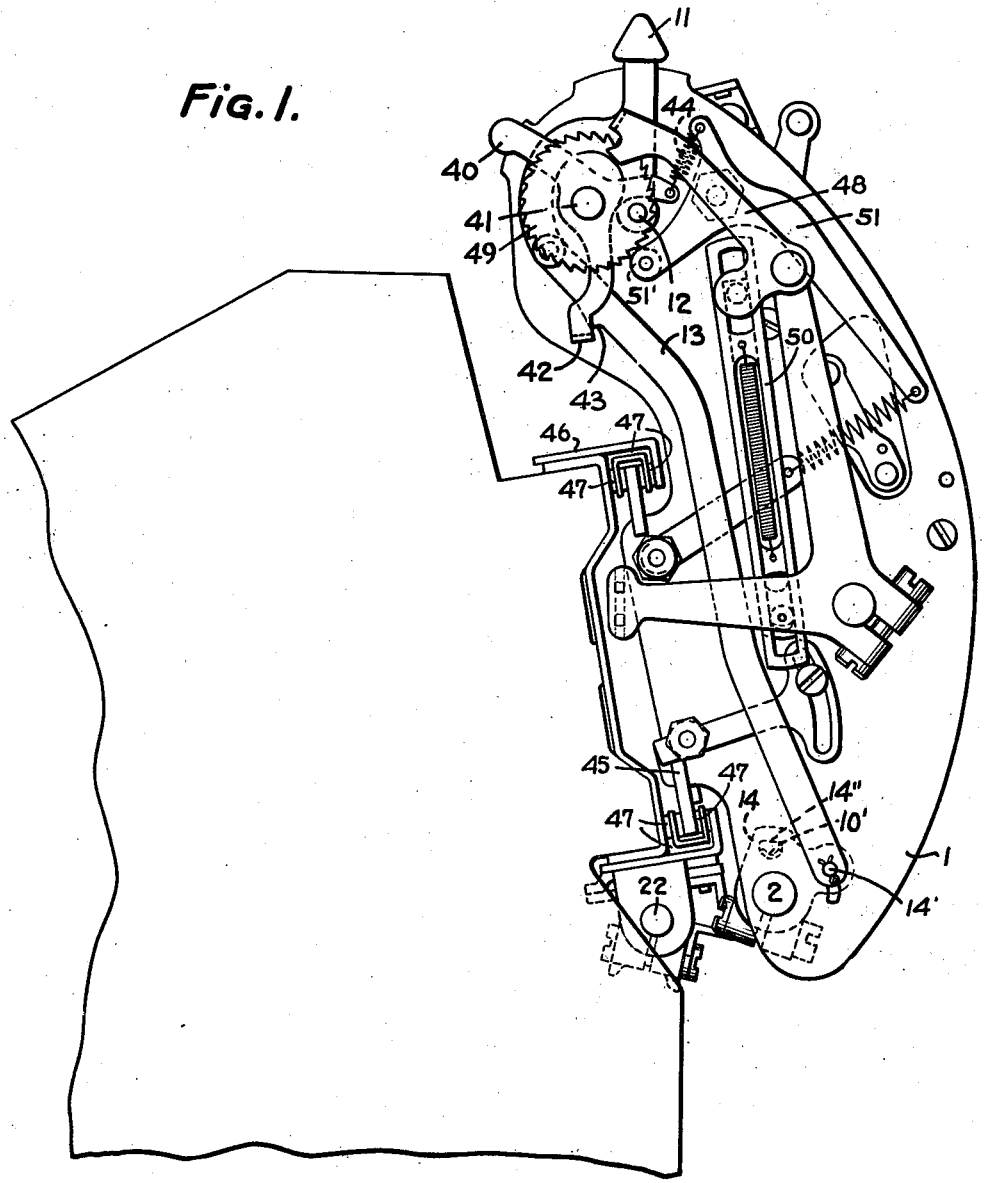
Figure 1 is a right side elevation of the machine, showing the invention as applied, with the tabulating lever in normal position.

The invention is shown as applied to a Monroe listing calculator, such for instance as disclosed in the U. S. patent to Crosman, No. 1,946,572.

In these drawings, the numeral 1 designates the shiftable carriage of the machine, slidably mounted upon the machine frame.

A shaft 2 having rotary bearings in the carriage frame ends has loosely mounted thereon a continuous series of tabulating stops or stop members 3, which are contiguous, being in contact with one another and so held under compression of identical light coiled springs 2' bearing against identical spacers 2'' of said shaft and the opposite ends of said series of stop members. These stop members have each upper forward and rear circumferential spaced seats 4 and 5, a lower circumferential bump or projection 6, and a forward nose or extension 7. A channeled member 8 of sheet metal surrounds said shaft on three sides and has upper and lower flanges and a rear flange all spaced from said shaft, said channeled member being mounted upon said shaft through the medium of a plurality of coiled springs 9, each at one end hooked into a perforation 9' of the upper flange and at its other end hooked into perforations 9'' of the rear flange, said springs extending around the forward and lower sides of said shaft and serving to elastically confine the channeled member to said shaft. The upper flange of the channeled member 8 is provided with a depending tooth 10, common to all of the stop members 3 and normally engaging the aligned rear seats 5 of the latter, the lower aligned bumps or projections 6 of said stop members normally engaging the lower flange of said channeled member, (Fig. 3).

A tabulating lever 11 is fulcrumed at 12 to one end of the carriage frame and has a link 13 connecting the lever at 14' with an end crank 14 fast to said shaft 2, so that upon manipulation of the tabulating lever the shaft 2 will be slightly rotated. Two identical end cranks 14 are provided, one fast to each end of said shaft, and each of U-form, split at the bend of the U, with a clamp bolt located in said bend. The tooth 10 of the channeled member is extended beyond both ends of said member at 10' into engagement with the similarly formed bottoms of upper free end radial slots 14" of said end cranks, so that while said end extensions normally rest upon said bottoms and are so held by engagement of the lower flange of the channeled member with said lower bumps of the stop members, as in Figure 3, they are upon disengagement of said lower flange from said lower bumps, as in Figure 4, capable of outward movement within said radial slots, said channeled member being then capable of upward displacement against the tension of said springs 9 bearing against shaft 2 to disengage tooth 10 from said rear seats, and of restoration by said springs to lower position to engage said tooth with said forward seats 4, as will be explained.

Spring means 15 are provided to yieldably retain the tabulating lever 11 in the normal position of Figure 1, and to restore said lever to normal position upon manipulation thereof in either of opposite directions following release of the lever.

A fixed stop 16 normally contacts the lower free edge of the channeled member 8 at a point diametrically opposite the tooth 10 of said member, said stop forming part of a member 16' mounted upon shaft 2 and having an arm fixedly engaging pin 16" of the carriage end frame, so that stop 16 is fixed or rigid with respect to the carriage frame.

Thus the stop members 3 are normally locked against rotation upon shaft 2, which rotation is requisite in order to set the stop members for tabulating purposes as will be explained.

Upon manipulation of the tabulating lever from normal position in one direction or forwardly of the machine, the assembly of said end cranks, said shaft, said channeled member and said stop members will be slightly rotated with said shaft, and due to fixed stop 16, the channeled member, and all of the stop members as a unit, will be displaced relative to each other so that the lower bumps or projections 6 of all of the stop members will become disengaged from the lower flange of the channeled member and the stop members will now be all unlocked against rotary movement upon shaft 2 and capable of being set to tabulating position, and the channeled member will become capable of upward displacement against the tension of the springs 9 bearing against said shaft to thereby yieldably retain all of the stop members in unlocked unset position.

Manipulative means are provided for rotating the stop members 3 upon shaft 2 for setting purposes to thereby upwardly adjust the noses 7 of spaced groups of stop members so that they will, in tabulating, have bumping engagement with bumper means of the machine frame to be described. This manipulative means comprises a lever 17, fast to the hub of a disk 18; said disk being mounted upon a shaft 19 and having a rod 20 connecting the same with a crank 21 fast upon a shaft 22; said shaft 22 having fast thereon a clamp 23 provided with a finger 24, capable of adjustment from the position of Figure 5 to that of Figure 8 and of contact with the noses of a spaced group of stop members to thereby rotate said group upon shaft 2 and adjust the noses of the group from the Figure 4 to the Figure 5 position. Shaft 22 has rotary bearings in lugs 32' of a stationary bracket 32 secured to the machine framing, the shaft being located by fast collars 22' thereof bearing against the outer sides of said lugs.

In accomplishing the setting of the group of stop members, the tabulating lever must be held as manipulated to unlock the stop members, in order to maintain the stop members unlocked during this setting, and to insure that the channeled member shall be displaceable upwardly by the ridges between the forward and rear seats 4 and 5 of said group against the tension of the springs 9 bearing against shaft 2, the channeled member being then restored by said springs into lower position in engagement with the forward seats 4 of said group which will now be yieldably retained by the channeled member in unlocked set position.

The finger 24 has a breadth approximately equal to the combined thickness of said group of stop members to be set. Said manipulative means is restored to normal position upon release of lever 17, following said setting, by hairpin spring 25 engaging fixed pin 26 of the carriage frame and pin 27 of said disk. This spring means also maintains setting lever 17 in normal position against movement thereof in either of opposite directions.

The bumper means of the machine frame with which, in tabulating, the spaced groups of stop members have bumping engagement seriatim upon successive manipulation and release of the tabulating lever 11, and shifting of the carriage, this manipulation being in a direction opposite to that previously stated, as will be explained, comprises a latch member 28, loosely mounted upon shaft 22 and held in normal position by spring means to be described with a downturned rear lug 30 thereof in the path of movement of the noses of the spaced groups of stop members 3 and forward end 31 thereof in stop engagement with the forward end of said bracket 32. The latch member 28 is provided in duplicate, the downturned lugs 30 thereof being spaced apart a distance approximately equal to the combined thickness of a group of stop members to be set, and inasmuch as the finger 24 operates in registration with said space, those stop members located immediately adjacent the end members of a group being set will be held down against being set through friction by the adjacent inner edges of the spaced lugs 30, thus insuring that the setting of the group will be properly accomplished and that said group will always be of the correct number. The clamp 23 and its finger 24 are located between the duplicate latch members 28.

Figure 7:
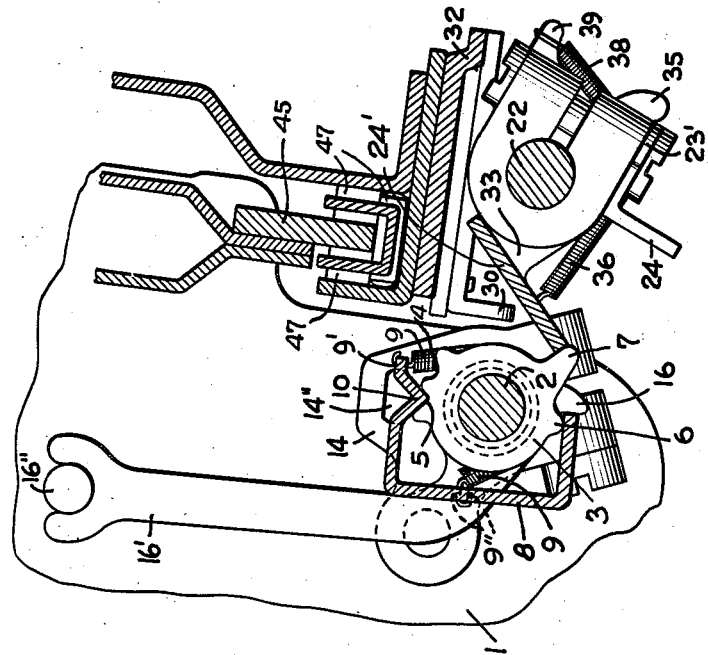
Figure 7 is a view similar to Figure 5, a group of set stop members being shown as restored to normal position, upon manipulation of the setting lever reversely, the tabulating lever being held at normal position by the operator in this operation.
Figure 5:
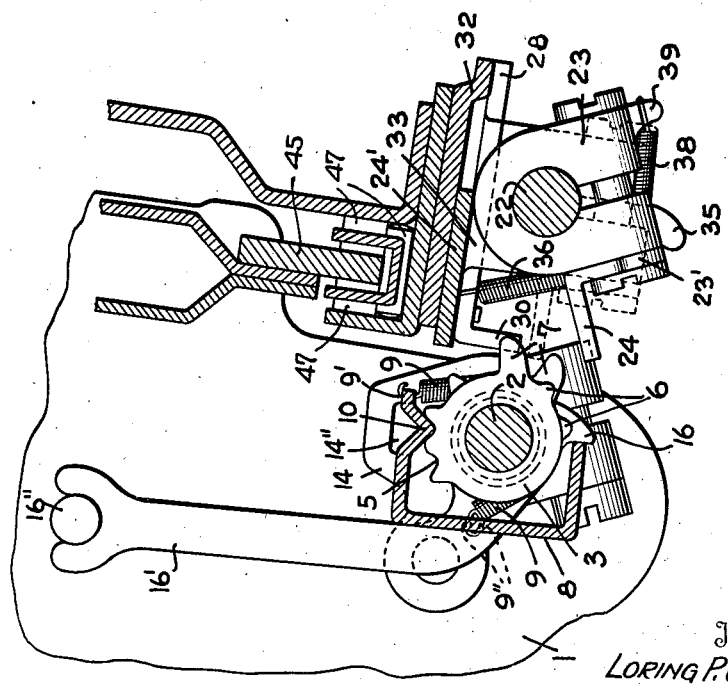
Figure 5 is a view similar to Figure 4, showing a group of stop members in set position, upon manipulation of the setting lever to move the clamp and the lower finger thereof from full line to dotted line position.
Figure 9:
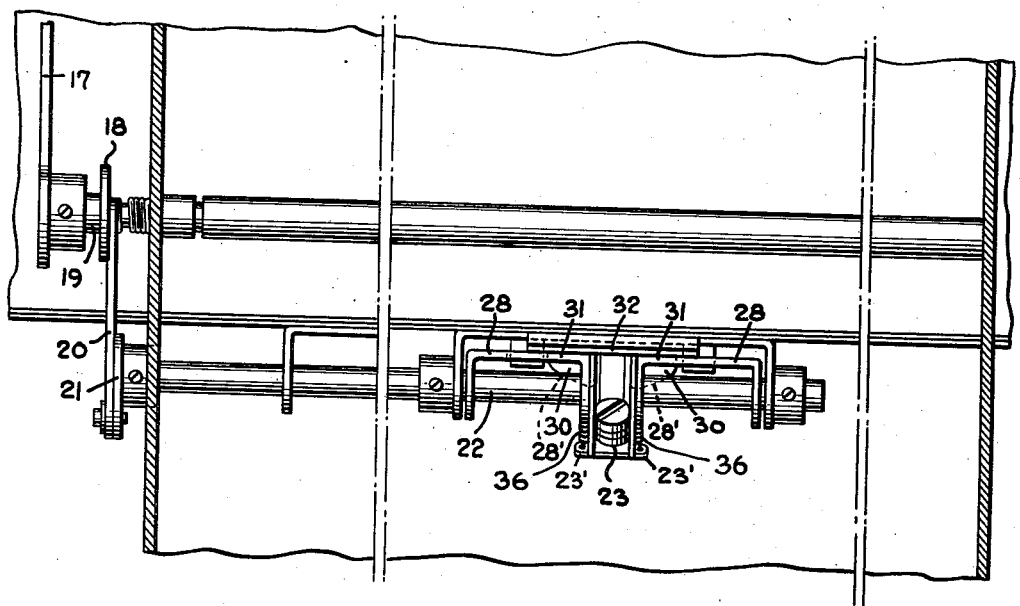
Figure 9 is a detail section on the line A—A, Figure 2.
Figure 10:
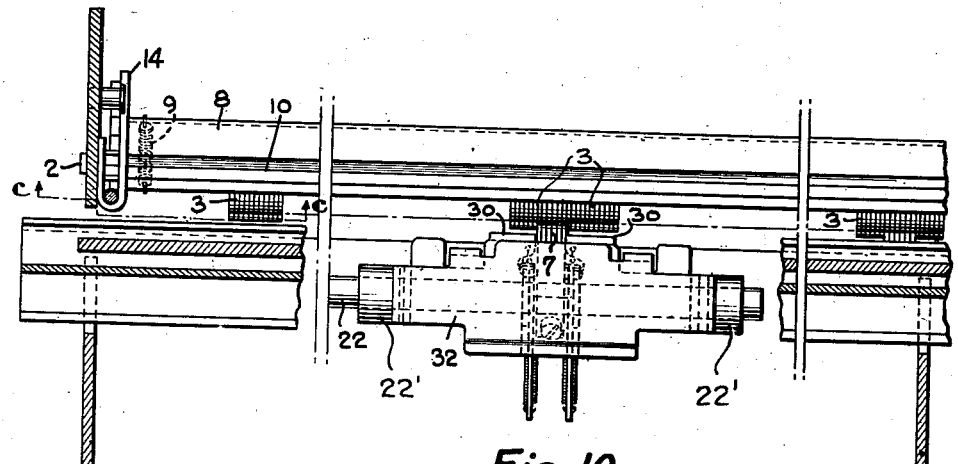
Figure 10 is a detail section on the line B—B, Figure 2.
Figure 11:
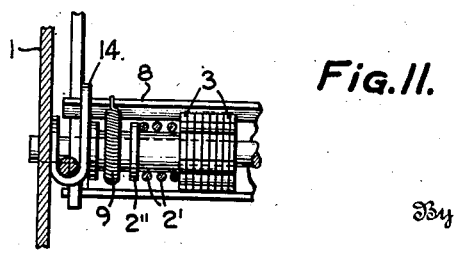
Figure 11 is a section on the line C—C, Figure 10.

A member 33 is loosely mounted upon shaft 22 between the duplicate latch members 28 and is provided with an upper finger 24' spaced from and of the same breadth as that of said lower finger 24, said member 33 and upper finger 24' upon reverse manipulation of the setting lever 17 being displaced downwardly from the Figure 5 position to the Figure 7 position to restore a group of set stop members to normal position. In this reverse manipulation of the setting lever lug 23' of the clamp 23 engages lug 35 of said member 33 to accomplish said downward movement of member 33 and its finger 24'. The setting lever upon release is restored to normal position by its retracting spring 25.

The duplicate latch members 28 are maintained in normal position and are restored to normal position following displacement thereof by a pair of coiled springs 36 attached at one end thereof to said latch members 28 and at the other end thereof to the opposite lateral lugs 23' of said clamp 23 and a second pair of coiled springs 38 in line with the first named pair and attached at one end thereof to said lateral lugs and at the other end thereof to lugs 39 of said member 33.

These two pairs of coiled springs also act to maintain in normal position the clamp 23, its finger 24, the member 33 and its finger 24' and to restore these parts to normal position following displacement thereof in operation of the machine.

From the aforesaid it will be noted that the clamp 23, its finger 24, the member 33 and its finger 24' are displaceable in one direction as a unit, to displace fingers 24 and 24' downwardly as for instance in restoring a group of set stop members to normal position, (Fig. 7); whereas the clamp 23 and its finger 24 are displaceable in the opposite direction (to displace finger 24 upwardly) independently of and without displacement of member 33 and its finger 24', as for instance in setting a group of stop members, (Fig. 8).

The manipulative means for setting spaced groups of stop members 3 for tabulating purposes, and capable of restoring an individual group of stop members to normal position upon reverse manipulation of lever 17, is also capable of restoring an individual group of set stop members minus one or the other end member of the group and of resetting the group plus an end member at either end of the group to make up the correct number and to vary to a minimum extent the spacing of columns on the paper sheet. This variance would be the thickness of a stop member 3, which in the present case is .040 inch, and inasmuch as the stop members 3 are provided in a continuous series and are contiguous, a greater number of such minimum spacings of columns on the paper sheet is available for use.

In the tabulating operation the carriage being shifted to starting position to the left and the lever 11 being manipulated from normal position rearwardly of the machine, the assembly of the end cranks 14, the shaft 2, the channeled member 8 and all of the stop members 3 including those both set and unset will be slightly rotated with shaft 2 to disengage the noses of the first group of set stop members to the left from the latch 28, whereupon the carriage will be shifted to the right a distance equal to that separating said set group of stop members and the next set group to the right and cause bumping engagement of the noses of said next group of set stop members to the right with the lug 30 of the right hand latch 28 constituting the bumper means, the tabulating lever 11 having been released in time to enable its retracting spring to restore it and the aforesaid assembly to normal position prior to said bumping engagement.

This tabulating manipulation of lever 11 is repeated for each tabulating movement of the carriage until the carriage is retracted to the extreme right.

The duplicate latches 28 have the downturned spaced lugs 30 thereof provided each with a cam edge 28' connecting the inner and outer edges, and in each shifting to the right of the carriage in tabulating, the noses of each group of set stop members in turn will contact the cam edge 28' of the lug 30 of the left hand latch member 28 and raise the latter against the tension of its retracting springs so that the said bumping engagement with the right hand latch member 28 may take place, said left hand latch member being then restored to normal position by said springs.

It being desired to restore all of the set stop member groups to normal position, the carriage is first shifted to a point between columns, the tabulating lever being then manipulated forwardly of the machine to rotate the assembly of said end cranks 14, said shaft 2, said channeled member 8 and all of the stop members 3 both set and unset, the noses of the unset stop members contacting the lugs 30 of the latch members 28 and raising the latter against the tension of their retracting springs into stop engagement with bracket 32 to limit the upward movement; and the tabulating lever being so held, the carriage is shifted either to the right or to the left whereupon the cam edge 28' of one of the latch members will contact the noses of all of the set stop member groups to restore the same.

In order to prevent the operator from inadvertently manipulating the tabulating lever 11 of the machine, a lever 40, fulcrumed upon the platen shaft 41, has one arm thereof provided with an offset end 42 having locking engagement beneath a projection 43 of link 13 to render the tabulating lever normally forwardly inoperative until after lever 40 has been manipulated to release said locking engagement. This manipulation of lever 40 takes place against the tension of a coiled spring 44 connecting with a tail arm of lever 40 and which normally maintains said locking engagement.

Means for slidably mounting the carriage upon the machine frame is briefly described as follows:

Upper and lower spaced rails 45 of the carriage have opposite upper and lower plane surfaces and opposite lateral plane surfaces, an anti-friction roller carrying member 46 mounted upon the machine frame having opposite upper and lower plane surfaces and opposite lateral plane surfaces spaced from those of said rails. A plurality of upper and a plurality of lower anti-friction rollers 47 of generally cylindrical form contact with and work within the spaces between the aforesaid opposite upper and lower and lateral plane surfaces of said member and said rails.

Suitable means are employed for line spacing the platen, including line spacing pawl 48 adapted to engage ratchet wheel 49 and maintained in normal position by a spring device 50 which is similar to the previously mentioned spring device 15. Suitable means are employed for maintaining the platen in adjusted position including the usual detent 51 having roller 51' engaging said ratchet wheel.

It is obviously within the spirit of the invention to adapt the carriage to be shifted to the right in tabulating operations, as well as to the left, by hand power alone, instead of using the spring retracting means of said Crosman patent; or to employ suitable electric motor means for shifting the carriage.

I claim:

1. In a machine of the class described, having a shiftable carriage; means for stopping the carriage in predetermined columnar positions in tabulating operations, including a continuous uninterrupted series of contiguous normally inactive stop members settable to active position in spaced groups in variable patterns and manipulable means for setting each of successive groups of stop members as a unit to active position, said manipulable means and said stop members being shiftably related to one another.

2. In a machine of the class described, having a shiftable carriage; means for stopping the carriage in predetermined columnar positions in tabulating operations, including a continuous uninterrupted series of contiguous normally inactive stop members mounted upon the carriage and settable to active position in spaced groups in variable patterns, and manipulable means mounted upon the machine frame for setting spaced stop member groups in a desired pattern.

3. In a machine of the class described, having a shiftable carriage; means for stopping the carriage in predetermined columnar positions in tabulating operations, including a series of contiguous normally inactive stop members mounted upon the carriage and settable to active position in spaced groups in variable patterns, manipulable means mounted upon the machine frame for setting spaced groups of stop members, and means contacting those stop members immediately adjacent the end members of a group being set to prevent the setting through friction of any stop members other than those of such group.

4. In a machine of the class described, having a shiftable carriage; means for stopping the carriage in predetermined columnar positions in tabulating operations, including a series of contiguous normally inactive stop members mounted upon the carriage and settable to active position in spaced groups in variable patterns, and manipulable means mounted upon the machine frame for setting spaced groups of stop members in variable patterns and for restoring and resetting a group minus one end member and plus a member at the opposite end for accomplishing slight variance in the spacing of columns.

5. In a machine of the class described, having a shiftable carriage; means for stopping the carriage in predetermined columnar positions in tabulating operations, including a series of contiguous stop members settable to active position in spaced relation in variable patterns, means for locking the stop members in normal position and for yieldably retaining said members in unlocked unset and in unlocked set position, means including a manipulable device for unlocking the stop members, and manipulable means for setting unlocked spaced stop members in a desired pattern.

6. In a machine of the class described, having a shiftable carriage; means for stopping the carriage in predetermined columnar positions in tabulating operations, including a series of contiguous stop members mounted upon the carriage and settable to active position in spaced relation in variable patterns, bumper means mounted upon the machine frame with which successive spaced set stop members have bumping engagement in the shifting of the carriage, means for locking the stop members in normal position and for yieldably retaining said members in unlocked unset and in unlocked set position, manipulable means for setting unlocked spaced stop members in a desired pattern, and means including a spring retracted device manipulable in one direction prior to said setting for unlocking the stop members and manipulable in the opposite direction subsequent to said setting for disengaging the set stop members from and engaging the same with said bumper means in tabulating.

7. In a machine of the class described, having a shiftable carriage; means for stopping the carriage in predetermined columnar positions in tabulating operations, including a series of contiguous stop members mounted upon the carriage and settable to active position in spaced groups in variable patterns, bumper means mounted upon the machine frame with which successive spaced groups of set stop members have bumping engagement in the shifting of the carriage, means for locking the stop members in normal position and for yieldably retaining said members in unlocked unset and in unlocked set position, manipulable means for setting unlocked spaced groups of stop members in a desired pattern, and means including a spring retracted device manipulable in one direction prior to said setting for unlocking the stop members and manipulable in the opposite direction subsequent to said setting for disengaging spaced groups of set stop members from and engaging the same with said bumper means in tabulating.

LORING PICKERING CROSMAN.